United States Patent [19]

Grabowski

[11] Patent Number: 4,940,193
[45] Date of Patent: Jul. 10, 1990

[54] SAFETY BELT RETRACTOR WITH IMPROVED DAMPENING

[75] Inventor: Richard M. Grabowski, Lockport, Ill.
[73] Assignee: Gateway Industries, Inc., Olympia Fields, Ill.
[21] Appl. No.: 303,283
[22] Filed: Jan. 26, 1989
[51] Int. Cl.$^5$ .................. B60R 22/40; B60R 22/04
[52] U.S. Cl. .................. 242/107.3; 242/107.4 R; 242/107.4 A; 280/807; 297/475
[58] Field of Search .............. 242/107.3, 107.4 R, 242/107.4 A, 107.4 B, 107.4 C, 107.4 D, 107.4 E, 75.2, 107.7, 156.1; 280/806, 807; 297/475–480

[56] References Cited

U.S. PATENT DOCUMENTS

| | | | |
|---|---|---|---|
| 540,048 | 5/1895 | Deissler | 242/156.1 |
| 4,130,255 | 12/1978 | Sasaki et al. | 297/478 X |
| 4,153,996 | 5/1979 | Rutty | 33/138 |
| 4,262,933 | 4/1981 | Fox | 280/802 |
| 4,361,294 | 11/1982 | Doty | 242/107.7 |
| 4,378,916 | 4/1983 | Keinberger | 242/107.2 |
| 4,381,085 | 4/1983 | Stephenson et al. | 242/107.3 |
| 4,385,775 | 5/1983 | Shimogawa et al. | 297/480 X |
| 4,461,493 | 7/1984 | Doty | 280/807 |
| 4,515,842 | 5/1985 | Kovacs | 138/119 |
| 4,605,180 | 8/1986 | Fisher, III et al. | 242/107.4 A |
| 4,708,364 | 11/1987 | Doty | 242/107.4 A |

Primary Examiner—John Petrakes
Attorney, Agent, or Firm—Fitch, Even, Tabin & Flannery

[57] ABSTRACT

A safety belt retraction apparatus is provided for use in a vehicle having at least one door and a chassis. The apparatus includes a safety belt retractor mechanism mounted on the vehicle door, and having a reel about which the webbing of the safety belt is wound. The reel is adapted to take up and let out the webbing. The safety belt retraction apparatus further inlcudes a resiliently compressible bellows of blow-molded plastic. The bellows is mounted at one end to a housing containing the retractor mechanism, and has an opposite web-engaging free end adjacent the reel. The bellows is dimensioned so that its free end is spaced from the reel during initial take-up operations. Thereafeter, upon continued winding of the webbing about the take-up reel, the free end of the bellows engages the webbing, and with continued winding is compressed so as to exert a friction force on the webbing during continued take-up. The friction force precludes loose winding of the webbing about the reel. The bellows may have either a cylindrical or a wedge-shaped configuration.

17 Claims, 2 Drawing Sheets

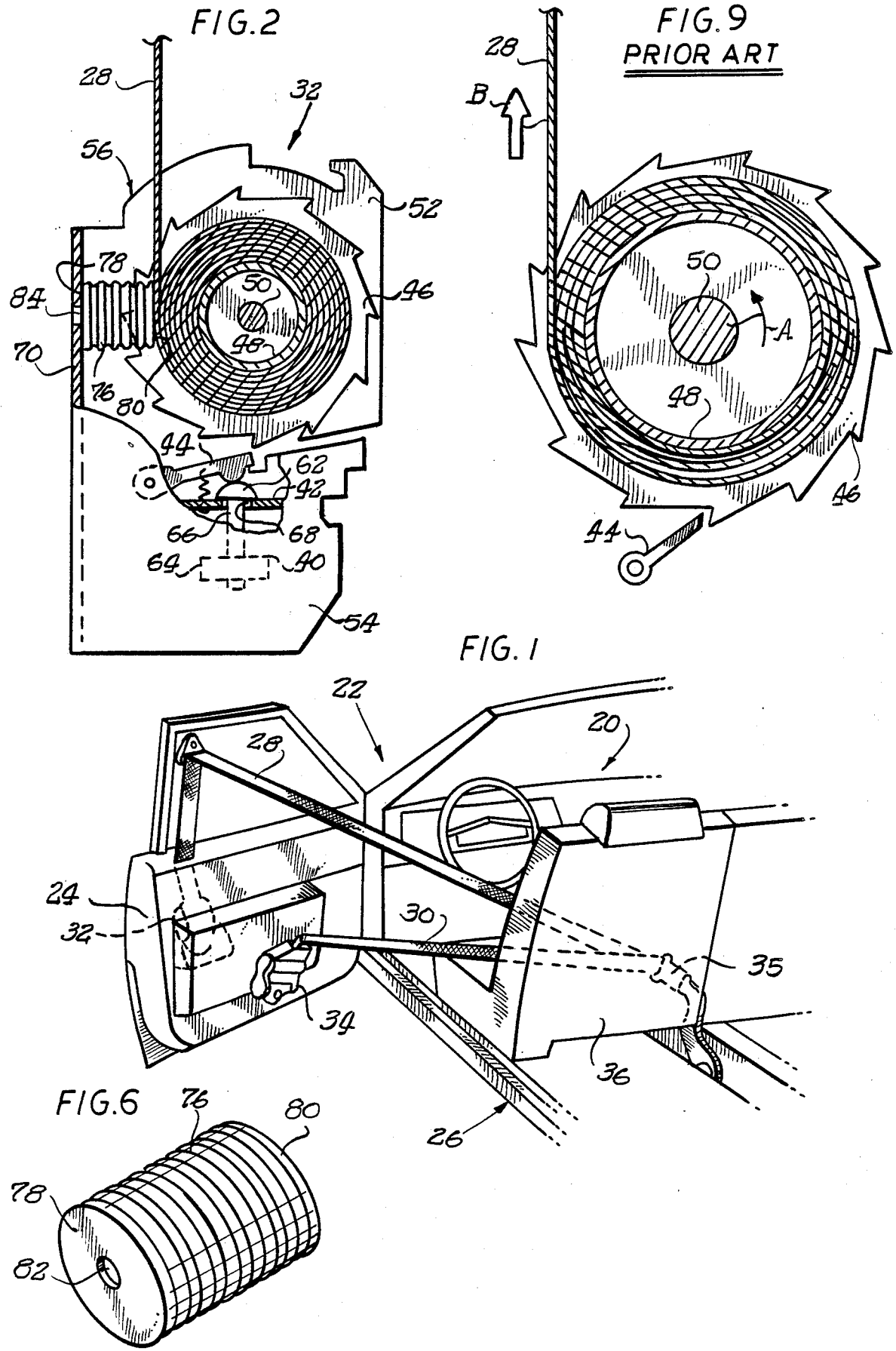

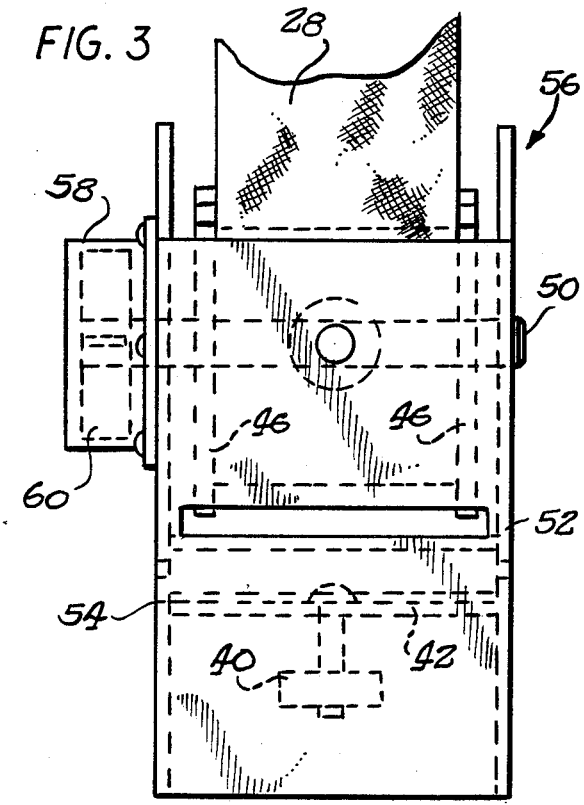
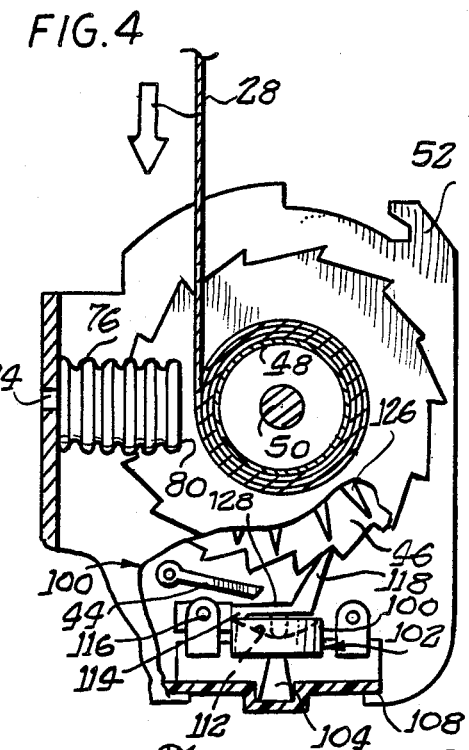
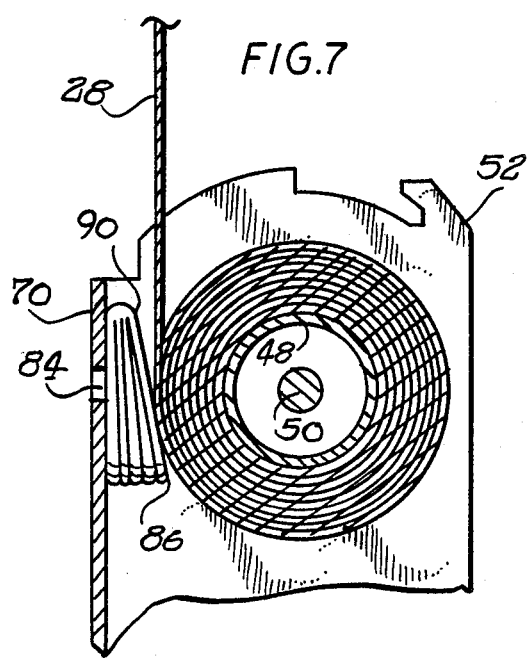
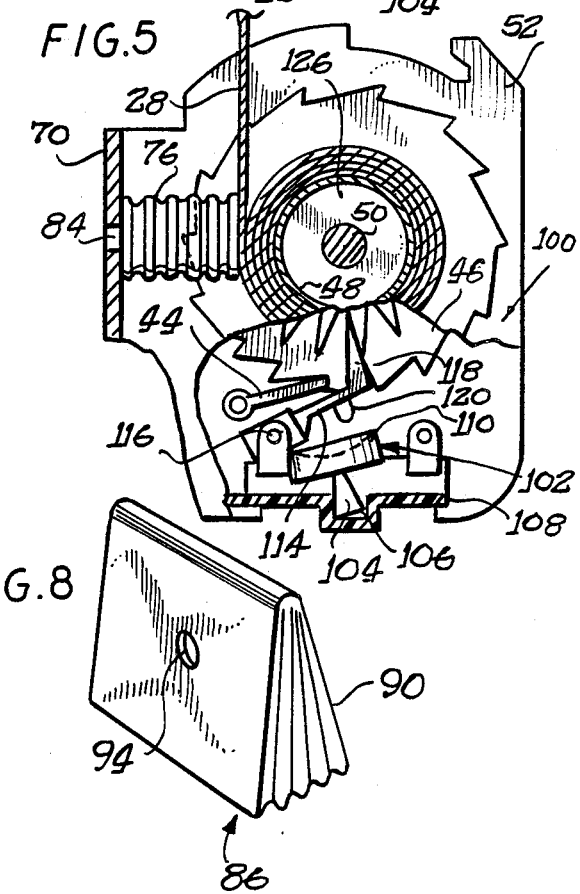

SAFETY BELT RETRACTOR WITH IMPROVED DAMPENING

BACKGROUND OF THE INVENTION

The present invention relates to a safety or seat belt retractor, and more particularly, to an improved dampening mechanism that more reliably prevents loose windings of the safety or seat belt from forming during take-up, while providing full winding speed during an initial take-up period.

Various safety belt retraction arrangements have been suggested to take up and pay out safety belts, i.e., seat belts and shoulder straps, about a vehicle occupant. In some of the automatic or so called passive seat belt systems, the seat belt retractor is mounted on the vehicle door and swings with the door, experiencing rapid accelerations and decelerations as the door is thrown open or is slammed shut. In swinging the door shut from the fully opened position, the seat belt retractor retracts the seat belt quickly to prevent the seat belt webbing from being caught between the door and the door molding. That is, if the seat belt webbing is not being wound quickly it will form a loop at the space between the door and the door molding and the loop will be caught therebetween before the retractor can wind the loop material or to the reel. With substantial rewind springs in these door mounted retractors, the retractors have been able to rewind the seat belt sufficiently fast that no loop is formed and caught between the door and the vehicle door molding. In some instances, another problem arises with this very fast winding of the seat belt in that slamming of the vehicle door results in a shifting of the retractor locking bar or pawl into a locking position, which prevents paying out of the seat belt, thereby effectively preventing the operator from gaining access to the interior of the vehicle. It appears that because the coils of seat belt are being wound so fast on the reel when the door is being slammed shut with high acceleration, that the coils of the seat belt are loose rather than tight and that when the door hits the soft resilient molding it compresses the molding as it abruptly decelerates. In some instances, the deceleration is sufficiently fast that the inertia weight is operated to move the lock bar into locking position and as the door rebounds and the "over-compressed" molding expands to a steady state configuration, the seat belt is pulled outwardly, taking up the slack from the loose coils and ratchet teeth on the ratchet engage the lock bar and hold the lock bar in its locking position because of the rake on the ratchet teeth. If someone subsequently tries to open the vehicle, he can not gain entry because the seat belt retractor is locked against any paying out of the seat belt, including pay out necessary to open the door. Of course, such sequence of actions to inadvertently lock the door are rare but are desired to be avoided.

One attempt at an inexpensive solution for eliminating loose windings of a safety belt during take-up has been proposed for retraction mechanisms mounted inside of a housing made of polypropylene or other plastic material. In arrangements of this type, a snorkel on the housing has a belt guiding slot for passage of a safety belt therethrough. In the proposed solution, the slot size is decreased to the point where the side walls forming the slot frictionally engage the safety belt and retard the movement of the belt at high speed travel. One problem in hot climates is that the temperature of the plastic housing may be raised to the point where it softens to the extent that the frictional grip is substantially reduced. Also, the continued rubbing of the belt on the plastic will wear the same and increase the slot opening at some point in the life of the vehicle.

It is therefore desirable to provide a retraction apparatus which is fast-acting during initial take-up, and which tensions or dampens the safety belt only during later stages of take-up. Several such arrangements have been shown. For example, U.S. Pat. No. 4,262,922 issued Apr. 21, 1981, to Fox discloses a dampening device for a seat belt retractor, having a friction wheel disposed in a hollow gear. The dampening prevents loose winding of the seat belt webbing during take-up within the retraction device. A plunger actuated by a vehicle door applies a locking force to the hollow gear, through a cable arrangement. Once locked, the hollow gear applies a friction force to the friction wheel through a wave spring. The arrangement, although capable of providing dampening after a certain amount of take-up has occurred, is costly to fabricate and install in a vehicle, and has a number of moving parts that can fail or otherwise create other operating difficulties.

U.S. Pat. No. 4,378,916 issued Apr. 5, 1983,to Keinberger discloses a safety belt wind-up device having a rubber-coated roller mounted for movement toward a webbing reel. The safety belt webbing is wrapped over the roller, and when tensioned, pulls the roller into contact with webbing previously wound on the reel. This provides frictional engagement with the webbing to prevent payout, and reduces spooling —that is, extra peyote after the retractor has been locked, which tightens loose windings. While providing a primary locking of the webbing reel, this arrangement fails to provide a dampening that reduces or eliminates loose windings of webbing about the take-up reel, and does not provide a dampening that occurs only after a predetermined amount of take-up is accomplished.

U.S. Pat. No. 4,381,085 issued Apr. 26, 1983, to Stephenson et al. is similar to Keinberger, but replaces the rolling friction wheel with a reciprocating block-like clamp. Operation is the same as in Keinberger, and suffers from the same deficiencies in that it fails to disclose a tensioning arrangement which eliminates loose winding of the webbing about a take-up reel, and does not provide a selective tensioning that occurs only after a predetermined amount of take-up is accomplished.

U.S. Pat. No. 4,153,996 issued May 15, 1979, to Rutty discloses a combination blade lock and shock absorber for a coilable rule comprising a lever which is mounted for both pivoting and translational movement. The blade of the rule passes between the lever and a rule housing. Brake shoes formed in the lever engage the blade as the lever is pivoted by a bias spring. The lever, under the action of the spring, presses the blade against the rule housing to provide a brake action which can be overcome by an operator on pivoting in an opposite direction. The free end of the blade has a dependent hook which, upon blade retraction into the housing, contacts the lever, causing a translational displacement thereof which works against the same bias spring mentioned earlier. This latter action provides a shock absorber when the blade is retracted into the housing. While providing a braking mechanism, this patent fails to disclose an arrangement for tensioning or dampening the web during take-up, let alone a selective dampening that occurs only after a predetermined amount of take-up is accomplished.

SUMMARY OF THE INVENTION

It is therefore the principle object of the present invention to provide an improved dampening arrangement for use in door-mounted safety belt retractors.

More particularly, it is an object of the present invention to provide a simple, low-cost dampening arrangement which selectively tensions the webbing of a safety belt retractor in a fail-safe manner after a predetermined amount of webbing has been taken up on a webbing take-up reel.

These objects, as well as others that will become apparent upon reference to the following detailed description and accompanying drawings, are provided by a safety belt retraction apparatus for use in a vehicle having at least one door and a chassis. The apparatus includes a reel about which safety belt webbing is wound and which is adapted to take up and let out webbing. A bellows device, either cylindrical or wedge-shaped, is positioned adjacent the reel. The bellows device has a web-engaging surface which is spaced from the reel when the reel is empty, and engages windings of the safety belt webbing which are built up on the reel. Further winding of the web compresses the bellows device so as to apply a dampening tension to the webbing.

BRIEF DESCRIPTION OF THE DRAWINGS

FIG. 1 illustrates a vehicle having a passive restraint system including a safety belt retraction apparatus embodying various features of the present invention and including one or more safety belt retraction mechanisms, and a dampening device which tensions the safety belt upon take-up;

FIG. 2 is a side elevational view of the belt retraction mechanism;

FIG. 3 is a front elevational view of the belt retraction mechanism of FIG. 2;

FIG. 4 and 5 show the dampening device at two different times during a safety belt take-up operation;

FIG. 6 shows the dampening device of FIGS. 4 and 5 in greater detail;

FIG. 7 is similar to FIGS. 4 and 5, but shows an alternative embodiment of the dampening device of the present invention;

FIG. 8 shows the dampening device of FIG. 7 in greater detail; and

FIG. 9 shows a prior art take-up reel illustrating loose windings of the safety belt about the take-up reel.

Corresponding reference characters indicate corresponding components throughout the several views of the drawings.

DESCRIPTION OF THE PREFERRED EMBODIMENT

Referring now to the drawings, a safety belt retraction apparatus embodying various features of the present invention is generally indicated in FIG. 1 by reference numeral 20. The apparatus 20 is for use in a vehicle 22 having at least one door 24 and a chassis 26. As used herein, the term "safety belt" is to be accorded its broad meaning which includes a shoulder strap 28 and/or a lap or seat belt 30. As shown in FIG. 1, the safety belt retraction apparatus 20 includes a safety belt retractor mechanism 32 for the shoulder strap and a retractor mechanism 34 for the lap belt. The retractor mechanisms are mounted on the door 24 to form part of a passive restraint system which functions to hold a vehicle occupant without his or her taking any steps to strap in, such as extending a belt and inserting a metal tongue attached to a webbing of that belt into an anchored buckle. Upon the occupant closing the door, the strap 28 and belt 30 are moved about the occupant and slack is taken up by the mechanisms 32 and 34.

The distal ends of the strap 28 and the belt 30 may be held by anchored buckles 35 disposed adjacent the center of the front seat 36 and the retractor mechanisms have rewinding means to take up the slack as the seated occupant swings the door 24 closed. Alternatively, the strap 28 and the belt 30 could include two runs of a length of webbing, the ends of which are held by the mechanisms 32, 34. An inertia sensor not shown in the figure controls operation of the retractor mechanisms 32, 34 upon the vehicle experiencing a sudden change in velocity to lock the mechanisms from paying out their respective strap and belt. Thus, the restraint system prevents the occupant from being thrown forward in the event of a crash.

As the retractor mechanisms 32 and 34 may be substantially identical, only mechanism 32 need be described in any detail. Referring to FIGS. 2 and 3, the retractor mechanism 32 is of the inertia operated kind and comprises an inertia weight 40 which is moved with predetermined deceleration or acceleration forces. The inertia weight may be a top-heavy toppling type of weight or it may be, as shown herein, a pendulum weight mounted on support bar 42 for swinging movement to operate a pivotally mounted locking bar or pawl 44 by pivoting it into locking engagement with a pair of ratchet wheels 46 mounted on opposite sides of a webbing reel 48. The webbing reel is mounted for rotation on a reel shaft 50 extending between opposite vertical frame sides 52 and 54 of a retractor housing or frame 56. The reel shaft 50 is journaled to rotate in the side frames 52 and 54 and a spirally wound clock-like spring 58 is attached to one end of the reel shaft 50 to rewind or take-up webbing of the safety belt. This rewind spring 58 is mounted within a protective cover 60 attached to the side frame 54. The pawl 44 is pivotal between a first position (shown in FIG. 2) wherein the pawl 44 is out of engagement with the ratchet wheels 46, and a second or locking position (shown in FIG. 5) wherein the pawl 44 engages the teeth of the ratchet wheels 46 to lock the retractor mechanism 32 against extension of the strap 28. For further information regarding retractor mechanisms having such reels, ratchet wheels and pawls, reference may be made to commonly assigned U.S. Pat. Nos. 4,361,294 and 4,461,493, the teachings of which are incorporated herein by reference.

The weight 40 includes an enlarged head 62 which is rockable on the upper surface 63 of the support bar 42, a weighted lower end 64, and a stem 66 passing through an aperture 68 (having an inside diameter larger than the outside diameter of the stem 66 so that the stem can freely move in the aperture) and interconnecting the head 62 and the lower end 64.

Referring again to FIG. 2, retractor frame 56 includes a rear frame wall 70 extending between frame sides 52, 54. The dampening means of the present invention comprises a resilient compressible chamber which is pleated to form a bellows 76 having a first end 78 mounted to rear frame wall 70 and an opposed web-engaging free end 80. The bellows 76 is shown in greater detail in FIG. 6, and is preferably made of a pleated blow-molded plastic construction. To relieve internal air pressure during compression of the bellows, an air vent 82 is provided in first end 78. A vent hole 84 is formed in rear frame wall 70 in registry with air vent 82.

Referring now to FIGS. 4 and 5, the free end 80 of bellows 76 is spaced from reel 48. In FIG. 4 only a few coils or windings of strap 28 are built up on reel 48, and the free end 80 of bellows 76 is still spaced from the spooled webbing. This corresponds to an initial closing of door 24, when full winding speed during take-up is needed to prevent strap 28 and belt 30 from falling between the door 24 and chassis 26.

As additional windings of strap 28 are built up on reel 48, they contact the free end of bellows 76 and with continued windings, compress the bellows as shown in FIG. 5. In this manner, bellows 76 selectively applies tension to additional portions of strap 28 wound on reel 48, to prevent loose windings which may lead to the mechanism jamming explained above.

The retraction mechanism 100 shown at the bottom of FIGS. 4 and 5 is not essential to an understanding of the dampening means and will be discussed herein at a later point.

The axial length of bellows 76 can be selected to engage strap 28 at any desired point during the take-up process. In FIG. 4, for example, bellows 76 is dimensioned to engage strap 28 after approximately five windings have been taken up on reel 48. Bellows 76 could be lengthened to engage strap 28 after only two windings, for example. Thus, selective dampening is accomplished, in that tensioning can be provided at any selected point during take-up.

The pressure, and hence the dampening friction force applied to strap 28 is held approximately constant by the bellows 76 of the preferred embodiment. If desired, the air vent 82 could be configured to release air at a greater or lesser rate, or even at a nonlinear rate, to control the friction force from winding to winding as strap 28 is built up on take-up reel 48. Such modifications can be readily performed by those skilled in the art. Of course, bellows 76 could be completely sealed to provide a different range of tension forces over its length of operation. The tensioning force applied to the web can also be controlled through a choice of bellows material, and the number of its pleats per unit length.

Referring now to FIGS. 7 and 8, an alternative construction of the bellows is indicated generally by the numeral 86 which is applied to another blow-molded pleated chamber. Bellows 86 has a mounting end 88, an opposed web-engaging end 90, and a wedge-shaped configuration of generally triangular cross-section. Other aspects and operational features of wedge-shaped bellows 86 are identical to those of cylindrical bellows 76. For example, bellows 86 includes an air vent 94 which aligns with vent hole 84 to relieve internal pressure during compression.

The dampening apparatus of the present invention prevents, as depicted in FIG. 9, the formation of a series of loose windings of strap 28 having been formed on reel 48. The loose windings allow payout movement of reel 48 in the direction opposite to that indicated by the arrow A as the door rebounds outwardly after having compressed the door molding. The retractor reel is being carried outwardly during this rebound and takes up the slack in the coils. If the deceleration has been sufficient at the time of slamming the door the inertia weight may have operated the pick or pawl and there may be a latching engagement of the locking pawl with the ratchet teeth at the time of door rebound movement and this subsequently prevents the operator from gaining access to the interior of the automobile. Such occurrences have indeed been experienced during testing of retraction devices and the rate of occurrence is significant enough to warrant careful attention to the problem. The bellows of the present invention effectively eliminates this occurrence by preventing the loose windings from forming.

The dampening means of the present invention will now be described with the retractor arrangement of FIGS. 4 and 5 wherein an extra mechanism is provided to time the movement of the pawl 44 into engagement with ratchet wheels 46. The modified retractor mechanism, generally designated at 100, is also of the inertia operated kind, and includes a top-heavy topping type of inertia weight 102 having a trapezoidal pedestal 104 received in a pocket 106 of a horizontal member 108. Upon experiencing a predetermined deceleration force, the enlarged head 110 of weight 102 causes the weight to topple with a rocking action, as indicated in FIG. 5. A dish-shaped contour 112 is conveniently formed in head 110 by a milling or grooving operation. An actuating lever 114 has a pivot mounting 116 at one end and a pawl or pick member 118 at its opposing, free end. Located at a point intermediate the two ends is a camming finger 120 which extends in a downward direction so as to be received in head 110, resting against contour 112 when retractor mechanism 100 is in its normal or rest position. Upon experiencing a deceleration force, the toppling of weight 102 causes camming finger 120 to ride along contour 112 in an upward direction, owing to the inclination of the contour during toppling of weight 102.

A spur gear 126 is located axially interiorly of ratchet wheel 46, and is either attached thereto by tabs, screws, welding or the like, or may be integrally molded with the ratchet wheel. Pick 118 is positioned immediately blow spur gear 126, whereas pawl 44 is positioned immediately below ratchet wheel 46. Actuating lever 114 is upwardly deflected by the toppling of weight 102, when its upper surface 128 contacts the free end of pawl 44. After initial contact, when pick 118 engages a spur gear tooth, continued rotation of the spur gear drives actuating lever 114 in an upward direction. Therefore, the toppling inertia weight 102 functions only to provide initial contact between pick 118 and spur gear 126. Thereafter, rotation of spur gear 126 continuously lifts pick 118 and actuating lever 114 in an upward direction. During this upward lift, pawl 44 is continuously lifted by upper surface 128 of lever arm 114 until its engagement with ratchet wheel 46 presents further rotation of the spur gear. Not only is the lifting force applied to pawl 44 increased, but its movement during engagement with ratchet wheel 46 is more closely controlled.

The bellows 76 engages the seat belt and applies a friction force thereto to tightly wind the belt coils on the reel as the door is slammed shut. Hence, slack in the coils is removed, which would otherwise allow belt extraction from the reel as the door rebounds and carries the reel away from the vehicle interior.

Thus, it can be seen that a new and improved dampening device for a retractor has been provided, and that it fully meets the objects set forth above. In particular, the foolproof tensioning provided by the present invention can be incurred at any selected point during safety belt retraction. While the present invention has been described with reference to door-mounted retraction mechanisms, those skilled in the art will readily appreciated that the invention may also be applied to chassis-mounted and other installations.

While the invention has been described in terms of a preferred embodiment, there is no intent to limit the invention to the same. On the contrary, it is intended to cover all modifications and equivalents within the scope of the appended claims.

What is claimed is:

1. Safety belt retracting apparatus for use in a vehicle having at least one door and a chassis, said apparatus comprising:
   a safety belt retracting mechanism including a reel about which a web of the safety belt is wound and which is adapted to rotate to take up and let out said web and
   a resiliently-compressible bellows device adjacent said reel having a web-engaging surface which is spaced from said reel so that said bellows device is compressed by said web as said web is taken up on said reel with said bellows device applying a tension to said web during said take-up.

2. The apparatus of claim 1 wherein said bellows device includes a pleated bellows-like member.

3. The apparatus of claim 2 wherein said bellows device is made of blow-molded plastic material.

4. The apparatus of claim 2 wherein said bellows device is generally cylindrical.

5. The apparatus of claim 2 wherein said bellows device is generally wedge-shaped.

6. The apparatus of claim 2 wherein said bellows device is vented to control internal pressure during compression thereof.

7. Safety belt retracting apparatus for use in a vehicle having at least one door and a chassis, said apparatus comprising:
   a housing carried by said door;
   a safety belt retracting mechanism disposed in said housing, said mechanism including a reel about which a web of the safety belt is wound and which is adapted to rotate to take up and let out said web; and
   a resiliently compressible bellows member having a first end contacting said housing and a second free end adjacent said reel, said free end having a web-engaging surface which is spaced from said reel so that said bellows member is compressed by said web as said web is taken up on said reel with said bellows member applying a tension to said web, during said take-up.

8. The apparatus of claim 7 wherein said bellows member is pleated.

9. The apparatus of claim 8 wherein said bellows member is generally cylindrical.

10. The apparatus of claim 8 wherein said bellows member is generally wedge-shaped.

11. The apparatus of claim 7 wherein said bellows member is vented to control internal pressure during compression thereof.

12. In a safety belt retraction apparatus, for use in a vehicle having at least one door and a chassis, the combination comprising:
    a housing;
    a reel disposed in said housing about which a web of the safety belt is wound and which is adapted to rotate to take up and let out said web so as to wind up and remove coils of said web from said reel;
    bias means for biasing said reel in a direction to take up said web;
    a ratchet means carried by said reel;
    pawl means engageable with said ratchet means and movable between a first position in which said pawl is out of engagement with said ratchet means and a second position wherein said pawl means engages said ratchet means to prevent said reel from paying out said web;
    an inertia operating means operable to move said pawl into engagement with said ratchet; and
    a resiliently compressible bellows having a first end contacting said housing and a second free end adjacent said reel, said free end having a web-engaging surface which is spaced from said reel so that a bellows chamber is compressed by said web as said web is taken up on said reel with said bellows applying a tension to said web during said take-up.

13. The apparatus of claim 12 wherein said housing is carried by said door with said safety belt extending between said door and said chassis.

14. The apparatus of claim 13 wherein said bellows engages said web after a first number of coils are built up on said reel, so that said web is selectively untensioned during an initial period of take-up.

15. The apparatus of claim 12 wherein said chamber is pleated to form the bellows.

16. The apparatus of claim 15 wherein said bellows is generally cylindrical.

17. The apparatus of claim 15 wherein said bellows is generally wedge-shaped.

* * * * *

UNITED STATES PATENT AND TRADEMARK OFFICE
CERTIFICATE OF CORRECTION

PATENT NO. : 4,940,193

DATED : July 10, 1990

INVENTOR(S) : Richard M. Grabowski

It is certified that error appears in the above-identified patent and that said Letters Patent is hereby corrected as shown below:

ON TITLE PAGE:   In the Abstract, line 7, change "inlcudes" to --includes--.

On the face: In the Abstract, line 13, change "Thereafeter" to --Thereafter--.

Column 1, line 9, change "cf" to --of--.

Column 1, line 27, change "or" to --on--.

Column 1, line 46, insert a space between "over-compressed" and "molding".

Column 2, line 23, change "Apr. 5, 1983,to" to --Apr. 5, 1983, to--.

Column 2, line 30, change "payout" to --pay out--.

UNITED STATES PATENT AND TRADEMARK OFFICE
CERTIFICATE OF CORRECTION

PATENT NO. : 4,940,193

DATED : July 10, 1990

INVENTOR(S) : Richard M. Grabowski

It is certified that error appears in the above-identified patent and that said Letters Patent is hereby corrected as shown below:

Column 2, line 31, change "peyote" to --pay out--.

Column 4, line 17, delete ":" (colon).

Column 7, line 15, after web insert --;-- (semicolon).

Signed and Sealed this

Thirty-first Day of March, 1992

Attest:

HARRY F. MANBECK, JR.

*Attesting Officer*  *Commissioner of Patents and Trademarks*